(12) United States Patent
Schweid et al.

(10) Patent No.: US 7,652,806 B2
(45) Date of Patent: Jan. 26, 2010

(54) OPTIMAL NODE PLACEMENT FOR MULTI-DIMENSIONAL PROFILE LUTS FOR ARBITRARY MEDIA AND HALFTONES USING PARAMETERIZED MINIMIZATION

(75) Inventors: Stuart Alan Schweid, Pittsford, NY (US); Lalit Keshav Mestha, Fairport, NY (US); Zhigang Fan, Webster, NY (US); Alvaro Enrique Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 244 days.

(21) Appl. No.: 11/961,367

(22) Filed: Dec. 20, 2007

(65) Prior Publication Data

US 2009/0161183 A1 Jun. 25, 2009

(51) Int. Cl.
*G03F 3/08* (2006.01)
(52) U.S. Cl. ............... 358/518; 358/1.9; 358/519; 358/522; 358/523; 358/524; 358/525; 382/162; 382/167; 345/589; 345/590; 345/600
(58) Field of Classification Search ............... None
See application file for complete search history.

(56) References Cited

U.S. PATENT DOCUMENTS

| 5,796,385 | A | * | 8/1998 | Rich | 345/600 |
| 5,933,131 | A | * | 8/1999 | Rich | 345/605 |
| 7,136,523 | B2 | * | 11/2006 | Fukao et al. | 382/167 |
| 2004/0246268 | A1 | * | 12/2004 | Nair et al. | 345/601 |
| 2006/0067584 | A1 | * | 3/2006 | Sato | 382/239 |
| 2006/0153441 | A1 | * | 7/2006 | Li | 382/162 |

* cited by examiner

*Primary Examiner*—Mark K Zimmerman
*Assistant Examiner*—Miya J Cato
(74) *Attorney, Agent, or Firm*—Fay Sharpe LLP (57) ABSTRACT

A method and system for optimal node placement of a color correction table first generate a high resolution color correction table. A low resolution color correction table is generated. Each node of the low resolution color correction table has a corresponding color correction value generated by interpolating the color correction values of the high resolution color correction table. A reconstructed color correction table is generated, and each of the nodes of the reconstructed color correction table has a corresponding color correction value generated by interpolating the color correction values of the low resolution color correction table using an interpolation method identical to an output device interpolation method. Differences between the color correction values of the reconstructed and the high resolution color correction table are quantified into a measure of error, and the node locations of the low resolution color correction table are adjusted, and the procedure is repeated.

23 Claims, 5 Drawing Sheets

OPTIMAL NODE PLACEMENT FOR MULTI-DIMENSIONAL PROFILE LUTS FOR ARBITRARY MEDIA AND HALFTONES USING PARAMETERIZED MINIMIZATION

BACKGROUND

The present application relates to the color imaging arts. It finds particular application to color correction tables as used in, e.g., printers, and will be described with particular reference thereto.

Heretofore, computers and other electronic equipment such as digital cameras have typically generated three-dimensional RGB (red, green, blue) color signals. Many printers, however, are configured to receive four-dimensional CMYK (cyan, magenta, yellow, and black) signals as input and, therefore, print CMYK colors which are determined from corresponding RGB values. A lookup table is commonly provided to convert each digital RGB color signal value to a corresponding digital CMYK value before being received by the printer. However, because printers inherently have a complex, nonlinear behavior and therefore have a complex nonlinear colorimetric response, even after a printer is calibrated, the full spectrum of CMYK values and printed colors is not a completely accurate representation of the original RGB spectrum. A discrepancy arises because the relationship between digital values that drive the printer and the resulting calorimetric response is a complex nonlinear function. A response or other value labeled as "colorimetric" indicates that the response has been measured by an instrument such as a spectrophotometer. To deal with this problem, a color correction lookup table is built which approximates the mapping between RGB colorimetric space and CMYK values. In other words, the color correction lookup table corrects for nonlinearities and unwarranted absorptions of inks or dyes such that the printer prints the true corresponding color.

The lookup table is a three-dimensional table wherein the RGB coordinates identify a three-dimensional vector location within the three-dimensional space. Each RGB coordinate is typically represented by an 8 bit red value, an 8 bit green value, and an 8 bit blue value. In this case, the RGB coordinate is capable of addressing $256^3$ locations. However, a table comprising such a large number of locations places a strain on computational resources. For this reason, it is desirable to generate a smaller table which requires less computational power to generate and use, and which is much more compact, which offers added benefit if the table is embedded as part of a document. A color correction table can be as small as 16×16×16 (4096) table locations, each of which stores a four-dimensional CMYK value. However, due to the above-described nonlinear response of the printer, there are areas of the color correction with high curvature that are under-sampled in the table and other smooth areas of the correction that are over sampled unnecessarily. Currently, small color correction tables result in loss of detail and higher delta E ($\Delta E$) accuracy in the darker areas. The term $\Delta E$ as used herein refers to a measure of color difference, e.g., a difference between a sample color and a reference color in L*a*b* color space. Heretofore, if the image quality loss was too large, higher density correction tables, i.e., larger tables, were employed to reduce the image quality loss, however, with the above-described associated drawbacks.

The present application provides a new and improved method and apparatus for determining a color correction table which overcomes at least the above-described problems.

BRIEF DESCRIPTION

A method for optimal node placement of a color correction table is provided. A first color correction table is generated having a first number of nodes at a first set of node locations. Each of the first number of nodes has a corresponding color correction value. A second color correction table is generated having a second number of nodes at a second set of node locations corresponding to the second number of nodes. The second number of nodes is less than the first number of nodes, and each of the second number of nodes has a corresponding color correction value based on the first color correction table. A third color correction table is generated having a third number of nodes at a third set of node locations. The third number of nodes is greater than the second number of nodes, and each of the third number of nodes has a corresponding color correction value based on the second color correction table. Differences between the color correction values of the third color correction table and the color correction values of the first color correction table are determined. The differences are quantified into a measure of error, and node locations of the second set of node locations are adjusted. The procedure of generating a second color correction table, generating a third color correction table, determining differences, and quantifying the differences is repeated at least one time.

An alternate method for optimal node placement of a color correction table is also provided. A high resolution color correction table is generated. The high resolution color correction table has a number of nodes greater than the number of nodes of an output device color correction table, and each node of the high resolution color correction table has a corresponding color correction value. A low resolution color correction table is generated, the low resolution color correction table having a number of nodes equal to the number of nodes of the output device color correction table. Each node of the low resolution color correction table has a corresponding color correction value generated by interpolating the color correction values of the high resolution color correction table at the node locations of the low resolution color correction table using any known interpolation method. A reconstructed color correction table is generated having a number of nodes equal to the number of nodes of the high resolution table, and each of the nodes of the reconstructed color correction table having a corresponding color correction value generated by interpolating the color correction values of the low resolution color correction table at the node locations of the reconstructed color correction table using an interpolation method identical to an output device interpolation method. Differences are determined between the color correction values of the reconstructed color correction table and the color correction values of the high resolution color correction table. The differences include at least one difference for each pair of respective nodes of the high resolution color correction table and the reconstructed color correction table. The differences are quantified into a measure of error, and the node locations of the low resolution color correction table are adjusted. The procedure of generating a low resolution color correction table, generating a reconstructed color correction table, determining differences, and quantifying the differences based on the quantified measure of error is repeated.

An image processing system utilizing a device color correction table when processing inputted images in preparation for outputting the inputted images is further provided. The system includes a storage system for storing the device color correction table and a processor configured to compute the device color correction table. The processor includes a high resolution color correction table generating unit, the high resolution color correction table having a number of nodes greater than the number of nodes of the device color correction table, each node of the high resolution color correction table having a corresponding color correction value. The processor also includes a low resolution color correction table generating unit, the low resolution color correction table having a number of nodes equal to the number of nodes of the device color correction table, each node of the low resolution color correction table having a corresponding color correction value generated by interpolating the color correction values of a high resolution color correction table at the node locations of the low resolution color correction table using any known interpolation method, wherein the high resolution color correction table has a number of nodes greater than the number of nodes of the device color correction table, each node of the high resolution color correction table having a corresponding color correction value. A reconstructed color correction table generating unit is further included, the reconstructed color correction table having a number of nodes equal to the number of nodes of the high resolution table, and each of the nodes of the reconstructed color correction table having a corresponding color correction value generated by interpolating the color correction values of the low resolution color correction table at the node locations of the reconstructed color correction table using an interpolation method identical to an output device interpolation method. Still further, a differences determining unit is included which is configured to compute differences between the color correction values of the reconstructed color correction table and the color correction values of the high resolution color correction table, the differences comprising at least one difference for each pair of respective nodes of the high resolution color correction table and the reconstructed color correction table. Yet further, a quantifying unit is configured to compute the differences into a measure of error, and a node adjustment unit is configured to compute adjusted node locations of the low resolution color correction table, wherein the processor repeats the steps of generating a low resolution color correction table, generating a reconstructed color correction table, determining differences, and quantifying the differences based on the measure of error.

DETAILED DESCRIPTION

Figure 1:
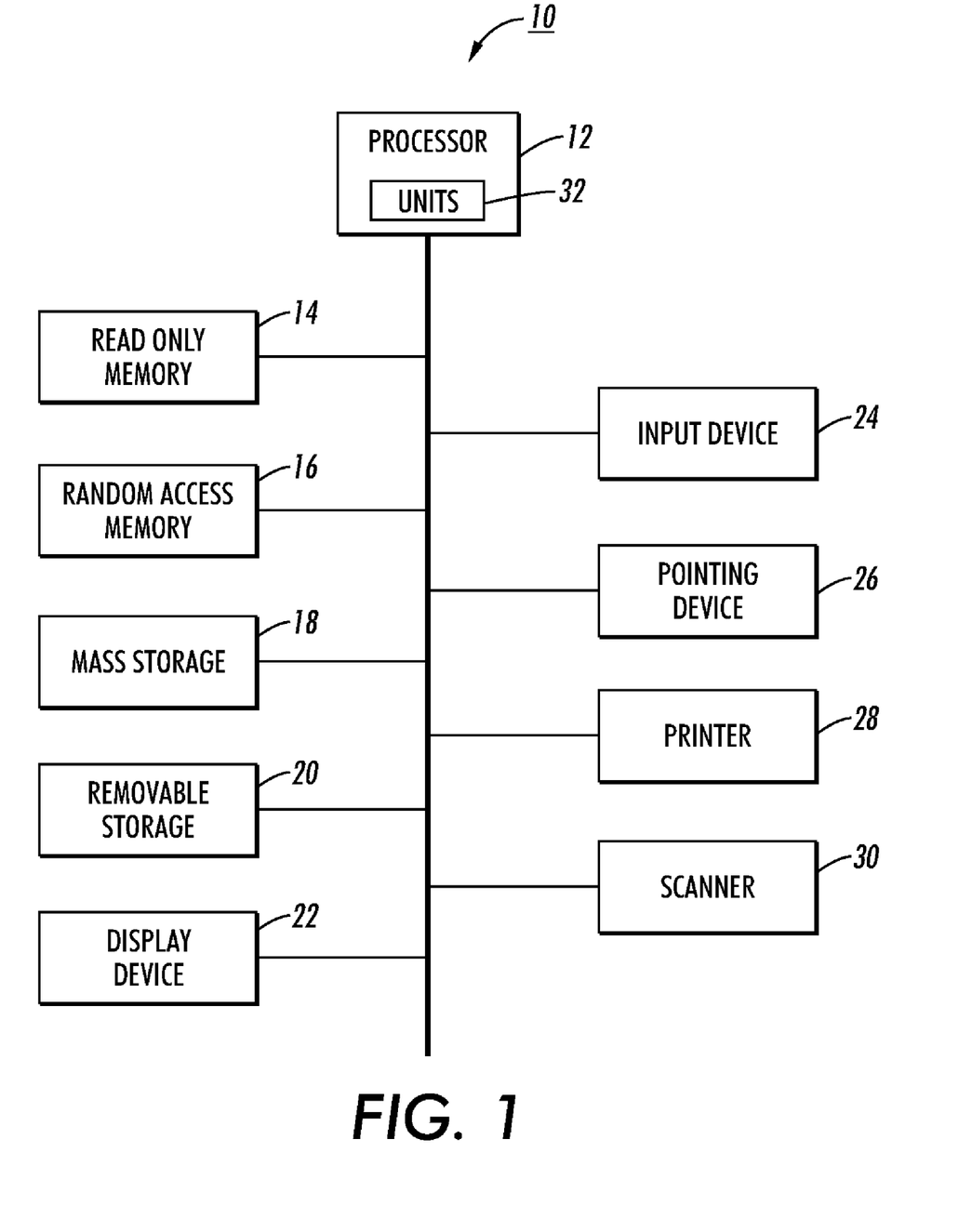
FIG. 1 is a schematic block diagram of an embodiment of a computer system incorporating concepts of the present application.

With reference to FIG. 1, a schematic block diagram is shown with an embodiment of a computer system 10 in which the herein-described method of optimal node placement can be utilized. The computer system 10 includes a processor 12, a read-only memory 14, random access memory 16, a data storage device 18 such as, e.g., a disk drive, and a removable data storage device 20 such as, e.g., a CD drive or a DVD drive. The computer system preferably includes a display device 22 such as a color monitor, an input device 24 for a user to enter commands to the computer system, a pointing device 26 such as, e.g., a mouse or trackball for manipulating a graphical user interface or other objects displayed on the display device 22. The computer system 10 may also be connected to a printer 28 and/or a scanner 30. Each of the printer 28 and the scanner 30 may be connected to the computer 10 either locally or by means of a network connection to e.g., a local area network. Processing units 32 according to concepts of the present application are executed by the processor 12. The processing units 32 are understood to be program modules or routines as known in the art. It is to be further understood that the processing units 32, although shown in the processor 12 in the FIGURE, may be stored in any one of the read only memory 14, the random access memory 16, or the removable storage 20, or the processing units 32 may be inputted to the system 10 by means of the input device 24 or a network connection (not shown). The processing units 32 are only shown in association with the processor 12 by reason of their execution being controlled by the processor 12.

Figure 2:
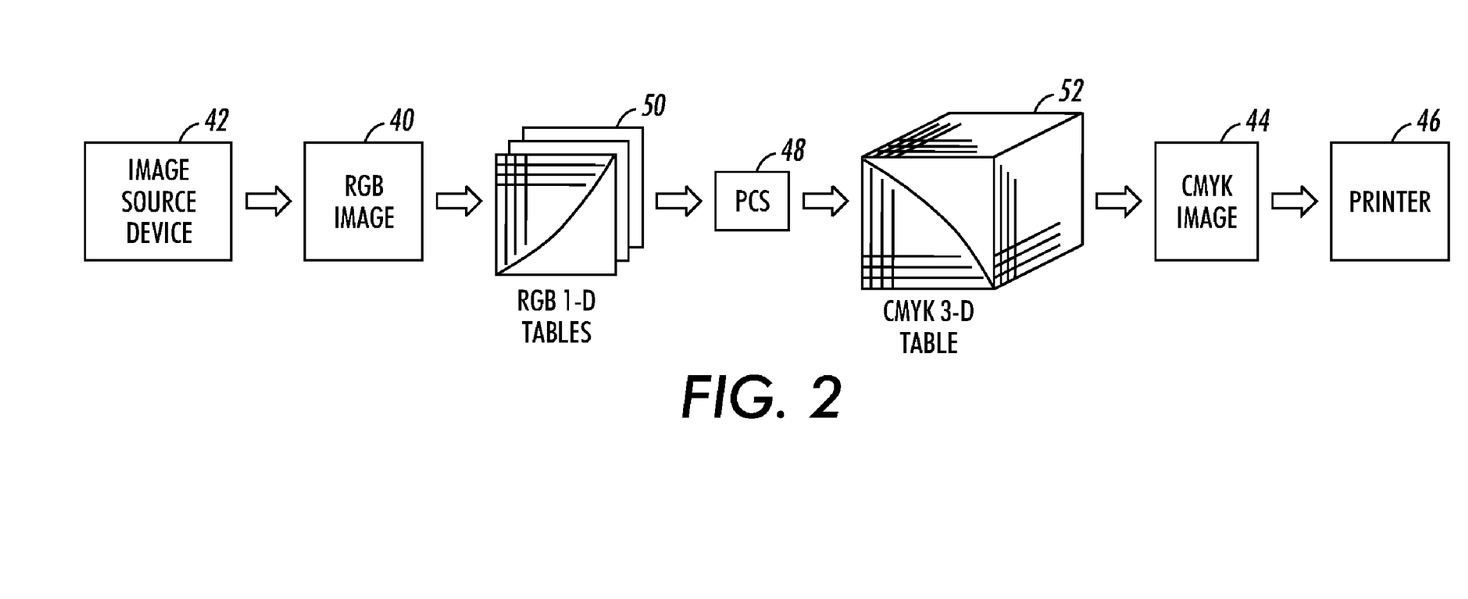
FIG. 2 is a block diagram showing processing of an RGB image in accordance with an international color consortium workflow.

With reference now to FIG. 2, an exemplary processing of an RGB image 40 derived from an RGB image source device 42 is shown. The RGB image 40 is converted to a CMYK image 44 for input to a printer 46. The flow diagram shown is in accordance with an international color consortium (ICC) workflow which calls for converting color image data formatted in an input color space such as, e.g., RGB, to a device independent color space called profile connection space (PCS) 48, and thereafter into color image data formatted for a color printer CMYK space. It is to be appreciated that the diagram shown in the FIGURE does not show all aspects of the ICC workflow and is intended only to show aspects of the ICC workflow that relate to the present application. As part of the ICC workflow for an RGB input, each of the R, G, and B components is processed through a one-dimensional color correction table 50. The resulting R', G', and B' signals are processed through a three-dimensional lookup table 52. According to the current ICC specification, nodes in each of the RGB one-dimensional tables 50 can be arbitrarily spaced. This beneficially enables optimum placement of the nodes and helps make it possible to have a correction table as small as 16×16×16 to fully define, e.g., an LAB to CMYK color correction as an ICC profile lookup table.

In addition to the previously described advantages of a smaller lookup table, newer profiling methods such as automatic spot color editing are used for real-time profiling which requires the printing of patches for updating the table values at the nodes. The node updates utilize patches printed on-site, i.e., on the owner's/lessee's machine, and keeping the patch set small is preferable so that fewer patches can be printed and measured when updating the lookup tables. The locations of the nodes in the color correction table 50 become more critical as the table becomes smaller, and although the nodes in the one-dimensional lookup table 50 can be arbitrarily spaced, the nodes in the three-dimensional lookup table 52 are required to have fixed spacing. Because the location of the nodes of a color correction table become more crucial as the table becomes smaller, it is beneficial to have a methodical means to optimally place the nodes of the table. An optimal placement of the nodes in the table allows adequate correction for small table sizes.

Figure 3:
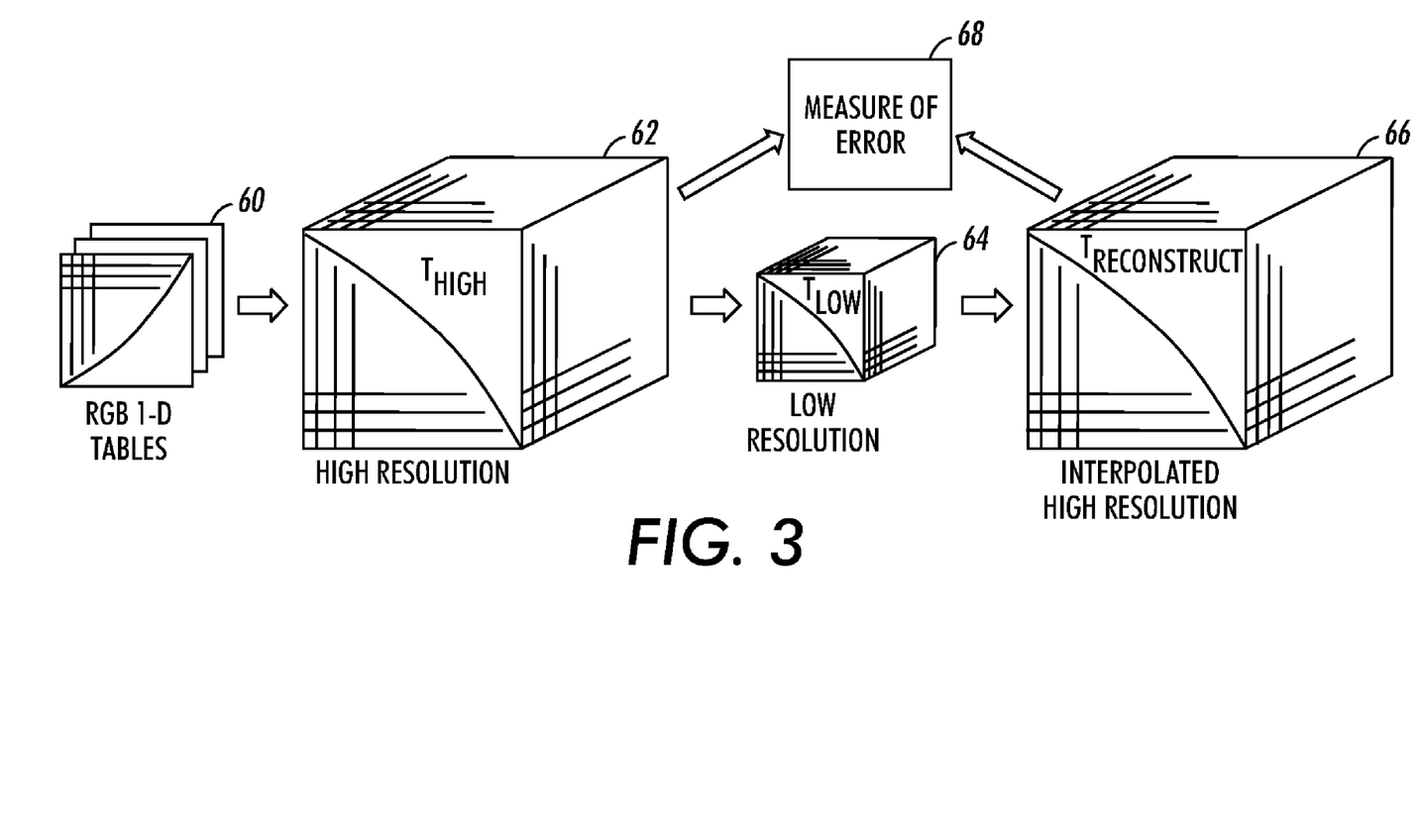
FIG. 3 is a block diagram of a method of optimally placing the nodes in a lookup table according to concepts of the present application.

With reference now to FIG. 3, there is shown a graphical representation in summary form of a method of optimally placing the nodes in a lookup table. Arbitrarily spaced RGB input color tables 60 are used to generate a high resolution color correction table 62 which is used as a guide for node placement of low resolution tables. The high resolution table preferably defines a correction at a much finer grid spacing than the table that is implemented in an actual device. The purpose of the high resolution table is not for direct color correction in an output device, but is instead used for guiding node placement in a low resolution table 64. Therefore, the generation of the high resolution table may be a one-time task that can be done during engineering development of the device. It is to be understood, however, that the scope is not limited to engineering development. For example, generation of the high resolution table can be used on-site, in the field as described above.

A high resolution three-dimensional color correction table 48 cubes wide, for example, will oftentimes provide adequate resolution as a guide for node placement in the low resolution tables. However, because generation of the high resolution table is essentially a one-time task, or an occasional task, a much higher table size is conceivable depending on the non-linearities observed in the print engine of the device being developed. The high resolution table 62 is used to create a low resolution table 64 which contains the same number of nodes as the desired table size for the machine being developed. The values of the low resolution table 64 are determined by interpolating the high resolution table 62 at the node locations of the low resolution table 64. Any known interpolation method for determining the values of the low resolution table may be used and need to not be the same as the interpolation method used in the final product. For example, in some embodiments a tetrahedral interpolation is used. The low resolution table 64 is thereafter used to generate a reconstructed high resolution table 66 whose nodes are chosen to be identical to the nodes of the original high resolution table 62. In this instance of interpolation, it is desirable that the interpolation scheme used to generate the reconstructed high resolution table 66 be identical to the interpolation scheme implemented for use with the low resolution table installed in the end product.

Differences between the high resolution table 62 and the reconstructed high resolution table 66 can now be quantified into a measure of error 68. One common measure of error or difference metric is the sum of squares of the differences, i.e., $$T_{high} \Rightarrow T_{low} \Rightarrow T_{reconstruct}$$

$$Error = \Sigma_{k=colors} \Sigma_{i=nodes} (T_{high}(i,k) - T_{reconstruct}(i,k))^2$$

The goal of this process is to choose the nodes of the low resolution table to minimize the sum of squares error (Error). For a 17×17×17 size table, the number of nodes subject to arbitrary placement is preferably 45, i.e., 15 for each color separation excluding the corner nodes. The corner nodes of the cube correspond to the range of the input, e.g., 0 to 1 or 0 to 255, and are therefore not subject to arbitrary placement, leaving the remaining 15 nodes in each separation open to arbitrary placement. The problem can be simplified by making the node locations identical for all three input channels. Thus, for example, the 17×17×17 table now involves the placement of only 15 variables when computing an optimized low resolution table. Making the node locations identical for all three input channels is beneficial for calibration of a machine that has high under color removal (UCR) or gray component replacement (GCR) where the grays are chosen from a single channel black dye rather than CMY combinations.

While the problem has been reduced in this example to a 15 variable optimization, the problem still remains a multivariate optimization. While there are tools for multivariate optimization, the problem can be further simplified if the node locations are parameterized using fewer variables. For example, it is possible to have the node locations placed in accordance with a parameterized placement function such as, e.g., $$node(i) = (e^{\lambda(i-1)/(N-1)} - 1)/(e^{\lambda} - 1)$$

where N represents the number of nodes in the table. Here, note that the node locations are a function of a single variable $\lambda$. An equation of this form also assures that the first node is placed at 0 and the last (Nth) node is placed at 1, and the distance between nodes is slowly varying. It is to be appreciated that the univariate function can be scaled to an appropriate range of values other than 0 to 1. For example, a scaling factor of 255 can be used for the aforementioned cubes corresponding to a range of the input from 0 to 255.

Figure 4:
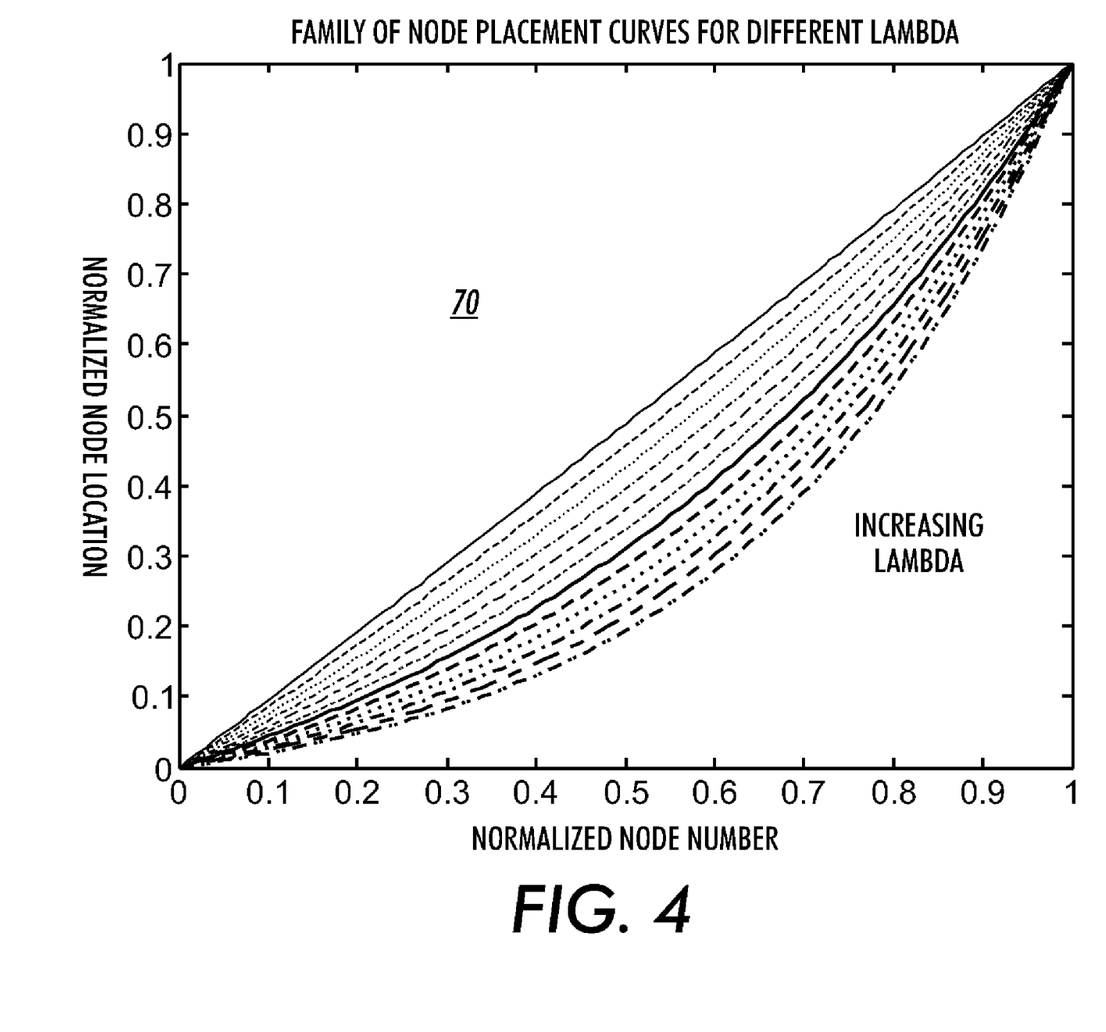
FIG. 4 is a family of curves for different values of a parameter of a univariate function.

With reference now to FIG. 4 and continuing reference to FIG. 3, a family of curves 70 is shown for different values of $\lambda$. As $\lambda$ increases, the curve flexes down and to the right as shown in the FIGURE. The optimization of the node locations is thus reduced to determining the $\lambda$ that minimizes the quantified measure of error 68 previously described. In this particular example, notice that as $\lambda$ increases, the nodes are placed closer together in the dark region on the left side of the FIGURE and farther apart in the light region on the right side of the FIGURE. The parameterized function just described is only one of many that can be used in embodiments of the present application. For example, gamma functions can be used in alternate embodiments. The parameterized function described, however, represents one convenient way to parameterize the node placement and greatly reduce the complexity of the original problem by reducing the problem from a multivariate optimization to a univariate optimization.

While the previously described univariate parameterized function performs well in many embodiments, in other embodiments, the table error values can be weighted according to printer response. For example, the error terms can be given higher weightings in areas of the color space where small changes in ink amount produce large $\Delta E$ shifts. Additionally, the inks can be weighted differently because, for example, small errors in yellow are much more acceptable than small errors in black. Therefore, the previously described sum of squares error function can be extended to $$Error = \Sigma_{k=colors} \Sigma_{i=nodes} \alpha(i,k)(T_{high}(i,k) - T_{reconstruct}(i,k))^2$$

where $\alpha(i,k)$ represents the printer's sensitivity to variation for a particular ink plane at a given input color. Note that the first described error function is a special case of the just described general form, but with all of the $\alpha(i,k)$ values equal to 1.

Although the placement of nodes has been described herein as part of the engineering design of a product, it is also possible to choose optimal node locations on-site, in the field as well. For example, typical applications could include determining color correction table node locations for tables used with custom halftones and/or custom media. Also, this method can be particularly useful when generated documents are to be embedded with a smaller profile table in the field. In essence, the described method acts as a downsampling scheme to create smaller profile LUTS from a single high density LUT. A one-time data correction can be done using a high resolution table while all subsequent corrections use a lower resolution table and fewer measurements.

Figure 5:
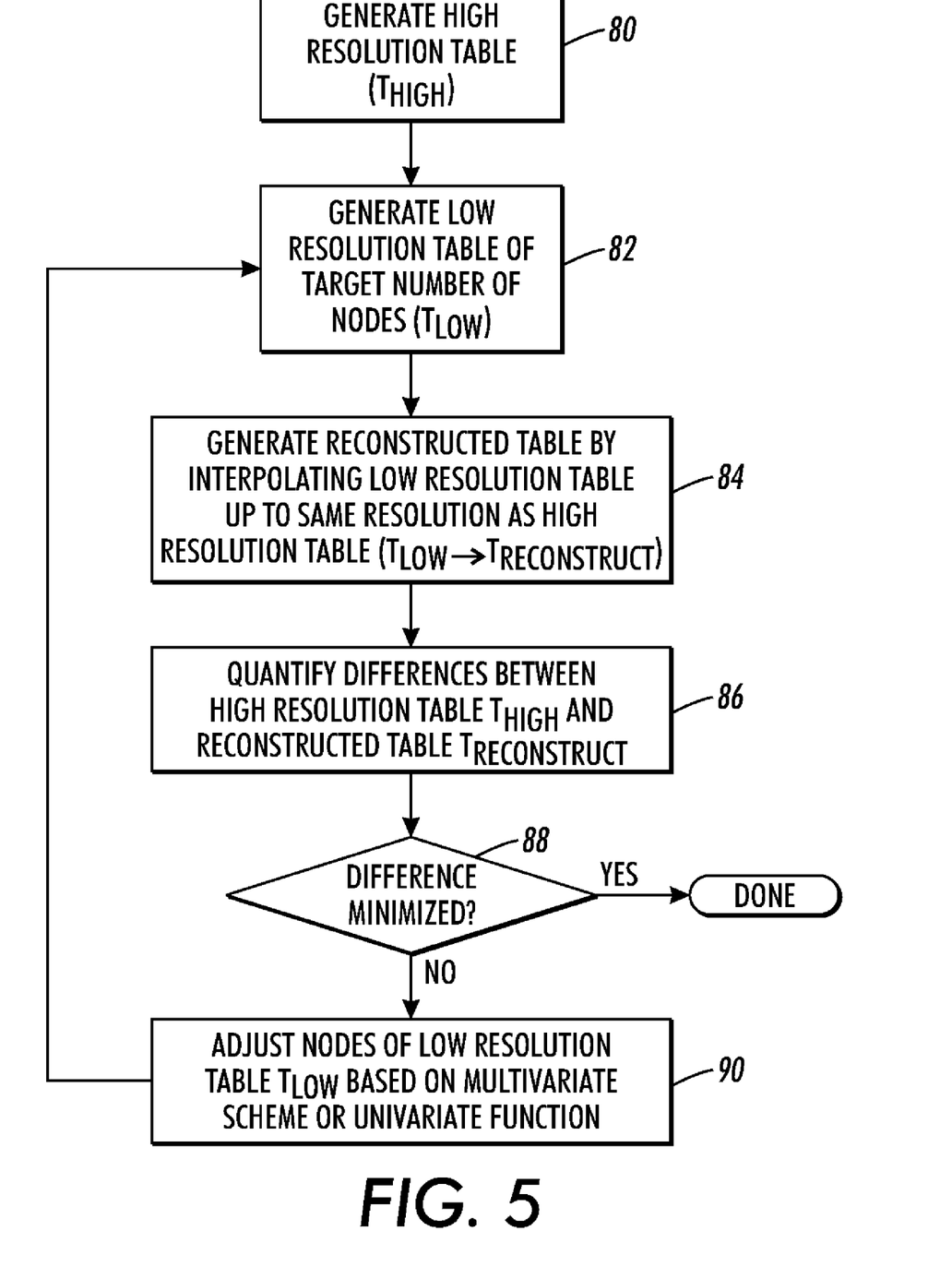
FIG. 5 is a flowchart of a method of optimal node placement according to concepts of the present application.

With reference now to FIG. 5 with continuing reference to FIG. 3 wherein like numerals represent like elements, a flowchart is shown describing an embodiment of a method according to the above-described optimal node placement. At step 80, a high resolution color correction table 62 is generated for use as a guide for node placement of low resolution tables. At step 82, the high resolution table 62 is used to create a low resolution table 64 which contains the same number of nodes as the desired table size for the machine being developed. The node locations in the low resolution table are initially predetermined but are adjusted during subsequent iterations of this method. As previously described, the values of the low resolution table 64 are determined by interpolating the high resolution table 62 at the node locations of the low resolution table 64 using any known interpolation method for determining the values of the low resolution table. At step 84, the low resolution table 64 is used to generate a reconstructed high resolution table 66 whose nodes are chosen to be identical to the nodes of the original high resolution table 62. The interpolation scheme used to generate the reconstructed high resolution table 66 is preferably identical to the interpolation scheme implemented for use with the low resolution table installed in the embodying output device.

At step 86, differences between the high resolution table 62 and the reconstructed high resolution table 66 are quantified into a measure of error 68. The measure of error is preferably of a sum of squares form as previously described and optionally incorporates a weighting coefficient representative of characteristics of the of the output device and representative of human visual color sensitivities, also as previously described. At step 88, a determination is made as to whether or not the quantified measure of error has been minimized, i.e., stabilized, or whether or not a predetermined error threshold has been satisfied. If the measure of error has neither been minimized or reached a satisfactory threshold, at step 90, the nodes of the low resolution table are adjusted. The node adjustment may be according to a multivariate scheme or function, or preferably by adjusting a parameter in a univariate function as previously described.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for optimal node placement of a color correction table, the method comprising:
generating a first color correction table having a first number of nodes at a first set of node locations, each of the first number of nodes having a corresponding color correction value;
generating a second color correction table, the second color correction table having a second number of nodes at a second set of node locations corresponding to the second number of nodes, the second number of nodes being less than the first number of nodes, and each of the second number of nodes having a corresponding color correction value based on the first color correction table;
generating a third color correction table having a third number of nodes at a third set of node locations, the third number of nodes being greater than the second number of nodes, and each of the third number of nodes having a corresponding color correction value based on the second color correction table;
determining differences between the color correction values of the third color correction table and the color correction values of the first color correction table;
quantifying the differences into a measure of error;
adjusting node locations of the second set of node locations;
repeating the steps of generating a second color correction table, generating a third color correction table, determining differences, and quantifying the differences at least one time; and
wherein the above steps are performed by a processor.

2. The method of claim 1, wherein:
the second number of nodes is identical to a number of nodes of an output device color correction table;
the second color correction table of a final iteration is implemented in the device as the output device color correction table;
the third number of nodes is equal to the first number of nodes; and
the third set of node locations is identical to the first set of node locations.

3. The method of claim 1, wherein the color correction values of the second color correction table are determined by interpolating the color correction values of the first color correction table at the node locations of the second color correction table using any known interpolation method.

4. The method of claim 1, wherein the step of generating a third color correction table includes determining the color correction values of the third color correction table by interpolating the color correction values of the second color correction by utilizing an interpolation scheme identical to the interpolation scheme implemented for use with an output device color correction table.

5. The method of claim 1, wherein the step of quantifying the differences includes quantifying a sum of squares of the differences.

6. The method of claim 1, wherein the step of quantifying the differences includes computing a first cost value for each of the differences based on a cost function and computing weighted cost values by multiplying each of the computed first cost values by at least one predetermined weighting coefficient.

7. The method of claim 1, wherein the step of repeating includes determining if the measure of error has been minimized or has satisfied a predetermined error threshold.

8. The method of claim 1, wherein the step of adjusting node locations includes adjusting the node locations of the second set of node locations by utilizing a multivariate scheme.

9. The method of claim 1, wherein the step of adjusting node locations includes adjusting the node locations of the second set of node locations by utilizing a univariate function.

10. The method of claim 9, wherein the univariate function comprises a selected function utilizing a single adjustment variable, and wherein the selected function does not does not adjust a first node location of the second set of node locations and a last node location of the second set of node locations.

11. The method of claim 10, wherein the univariate function comprises:

$$\mathrm{node}(i) = (e^{\lambda \cdot (i-1)/(N-1)} - 1)/(e^{\lambda} - 1);$$

wherein, N is the second number of nodes, i is a node index to the second set of nodes, node(i) is an $i^{th}$ node position vector value of the second set of nodes, and $\lambda$ is the adjustment variable.

12. A method for optimal node placement of a color correction table, the method comprising:

generating a low resolution color correction table, each node of the low resolution color correction table having a value generated by interpolating values of a high resolution color correction table at the node locations of the low resolution color correction table using any known interpolation method;

generating a reconstructed color correction table having a number of nodes equal to the number of nodes of the high resolution table, and each of the nodes of the reconstructed color correction table having a corresponding value generated by interpolating values of the low resolution color correction table at the node locations of the reconstructed color correction table using an interpolation method identical to an output device interpolation method;

determining differences between the values of the reconstructed color correction table and the values of the high resolution color correction table, the differences comprising at least one difference for each pair of respective nodes of the high resolution color correction table and the reconstructed color correction table;

quantifying the differences into a measure of error;

adjusting node locations of the low resolution color correction table;

repeating the steps of generating a low resolution color correction table, generating a reconstructed color correction table, determining differences, and quantifying the differences, based on the quantified measure of error; and wherein the above steps are performed by a processor.

13. The method of claim 12, wherein the low resolution color correction table has a number of nodes equal to the number of nodes of the output device color correction table, and wherein the step of quantifying the differences into a measure of error includes computing a first cost value for each of the differences based on a cost function and computing weighted cost values by multiplying each of the computed first cost values by at least one predetermined weighting coefficient.

14. The method of claim 12, wherein the step of adjusting node locations includes adjusting the node locations of the low resolution color correction table by utilizing a univariate function.

15. The method of claim 14, wherein the univariate function comprises a selected function utilizing a single adjustment variable, and wherein the selected function does not does not adjust a first node location of the low resolution color correction table and a last node location of the low resolution color correction table.

16. The method of claim 15, wherein the univariate function comprises:

$node(i) = (e^{\lambda(i-1)/(N-1)} - 1)/(e^{\lambda} - 1);$ wherein, N is the number of nodes of the low resolution color correction table, i is a node index to the low resolution color correction table, node(i) is an $i^{th}$ node position vector value of the low resolution color correction table, and $\lambda$ is the adjustment variable.

17. The method of claim 12, further comprising:
installing the low resolution color correction table in the output device as the output device color correction table.

18. An image processing system utilizing an output device color correction table when processing inputted images in preparation for outputting the inputted images, the system comprising:

a storage system for storing the output device color correction table; and a processor configured to compute the output device color correction table, the processor including:

a low resolution color correction table generating unit for computing a low resolution color correction table, each node of the low resolution color correction table having a value generated by interpolating values of a stored high resolution color correction table at the node locations of the low resolution color correction table using any known interpolation method;

a reconstructed color correction table generating unit for computing a reconstructed color correction table having a number of nodes equal to the number of nodes of the high resolution table, each of the nodes of the reconstructed color correction table having a corresponding value generated by interpolating values of the low resolution color correction table at the node locations of the reconstructed color correction table using an interpolation scheme identical to an output device interpolation scheme;

a differences determining unit for computing differences between the values of the reconstructed color correction table and the values of the high resolution color correction table, the differences comprising at least one difference for each pair of respective nodes of the high resolution color correction table and the reconstructed color correction table;

a quantifying unit configured to compute the differences into a measure of error; and a node adjustment unit configured to compute adjusted node locations of the low resolution color correction table;

wherein the processor is further configured to repeat the steps of computing a low resolution color correction table, computing a reconstructed color correction table, computing differences, and quantifying the differences based on the measure of error until the measure of error is minimized or reaches a predetermined threshold, and wherein the output device color correction table is updated based on the low resolution color correction table.

19. The system of claim 18, wherein the low resolution color correction table has a number of nodes equal to the number of nodes of the output device color correction table, and wherein the quantifying unit is further configured to compute a first cost value for each of the differences based on a cost function and compute weighted cost values by multiplying each of the computed first cost values by at least one predetermined weighting coefficient.

20. The system of claim 18, wherein the node adjusting unit is further configured to adjust the node locations of the low resolution color correction table by utilizing a univariate function.

21. The system of claim 20, wherein the univariate function comprises a selected function utilizing a single adjustment variable, and wherein the selected function does not does not adjust a first node location of the low resolution color correction table and a last node location of the low resolution color correction table.

22. The system of claim 21, wherein the univariate function comprises:

$$\text{node}(i) = (e^{\lambda(i-1)/(N-1)} - 1)/(e^{\lambda} - 1);$$

wherein, N is the number of nodes of the low resolution color correction table, i is a node index to the low resolution color correction table, node(i) is an $i^{th}$ node position vector value of the low resolution color correction table, and $\lambda$ is the adjustment variable.

23. The system of claim 18, wherein the system comprises a xerographic system and the output device comprises a xerographic imaging device.

* * * * *